July 14, 1953     W. H. FEENEY ET AL     2,645,134
FEED AND TRAVERSE MECHANISM FOR AUTOMATIC TURRET LATHES
Filed July 14, 1950     3 Sheets-Sheet 3
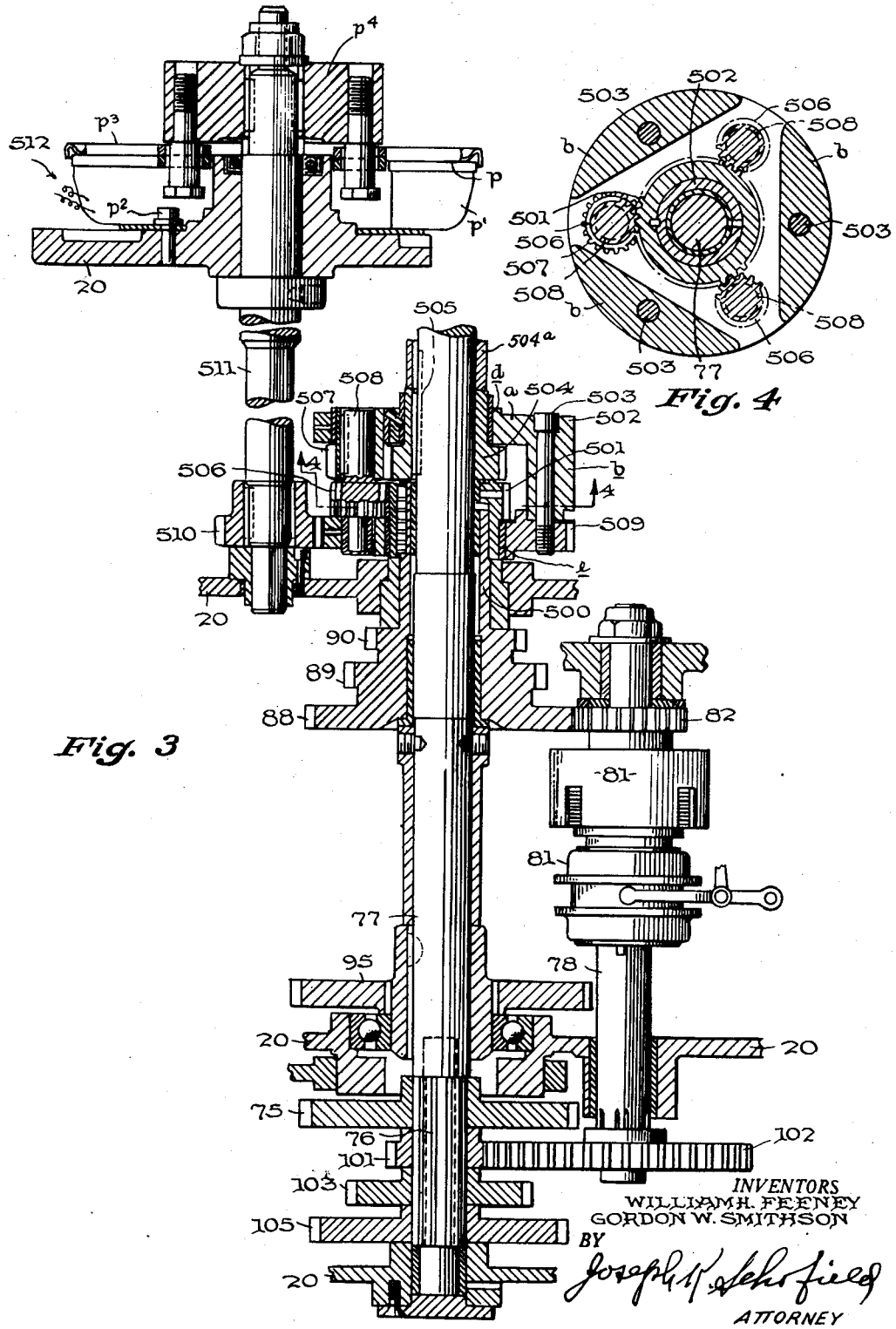

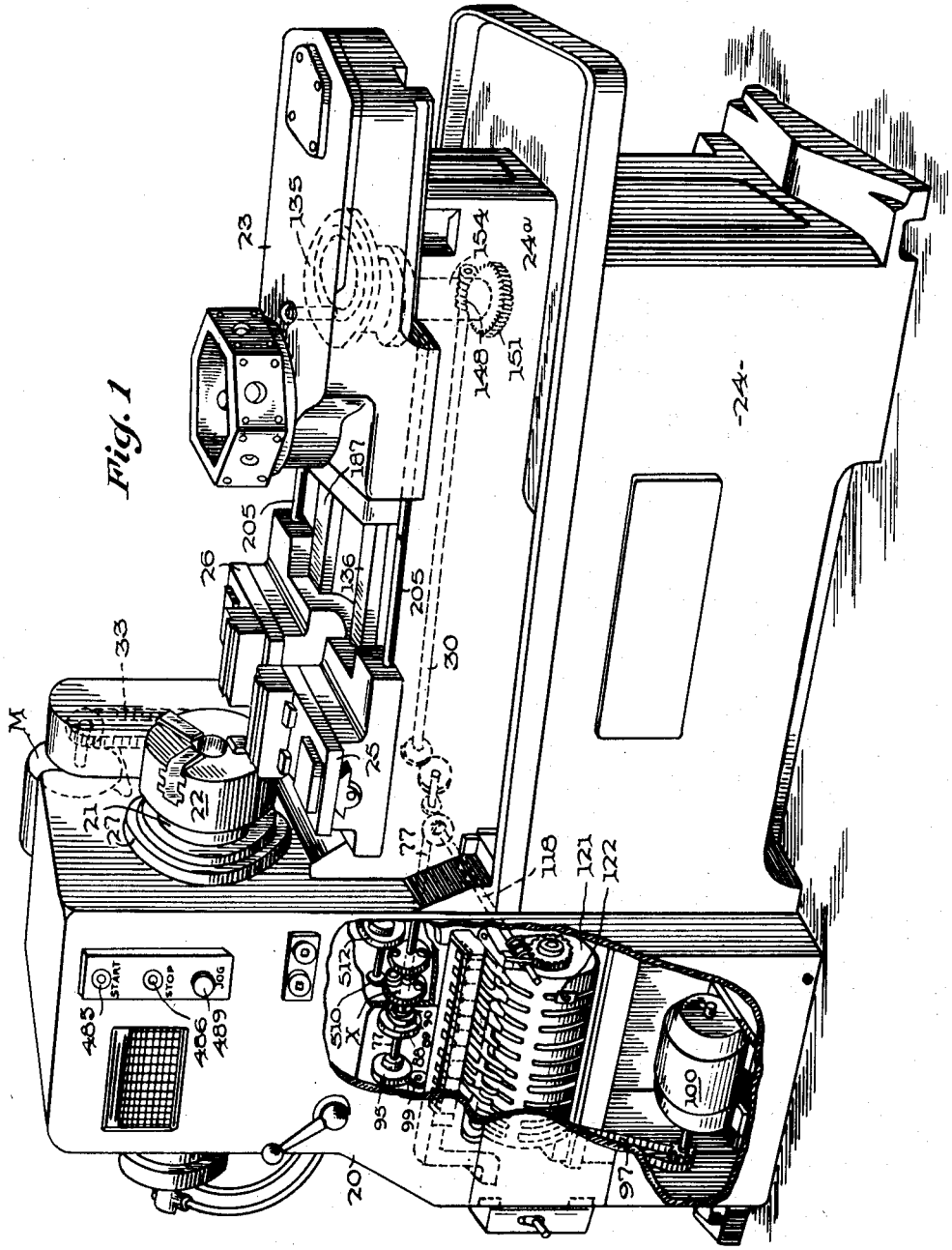

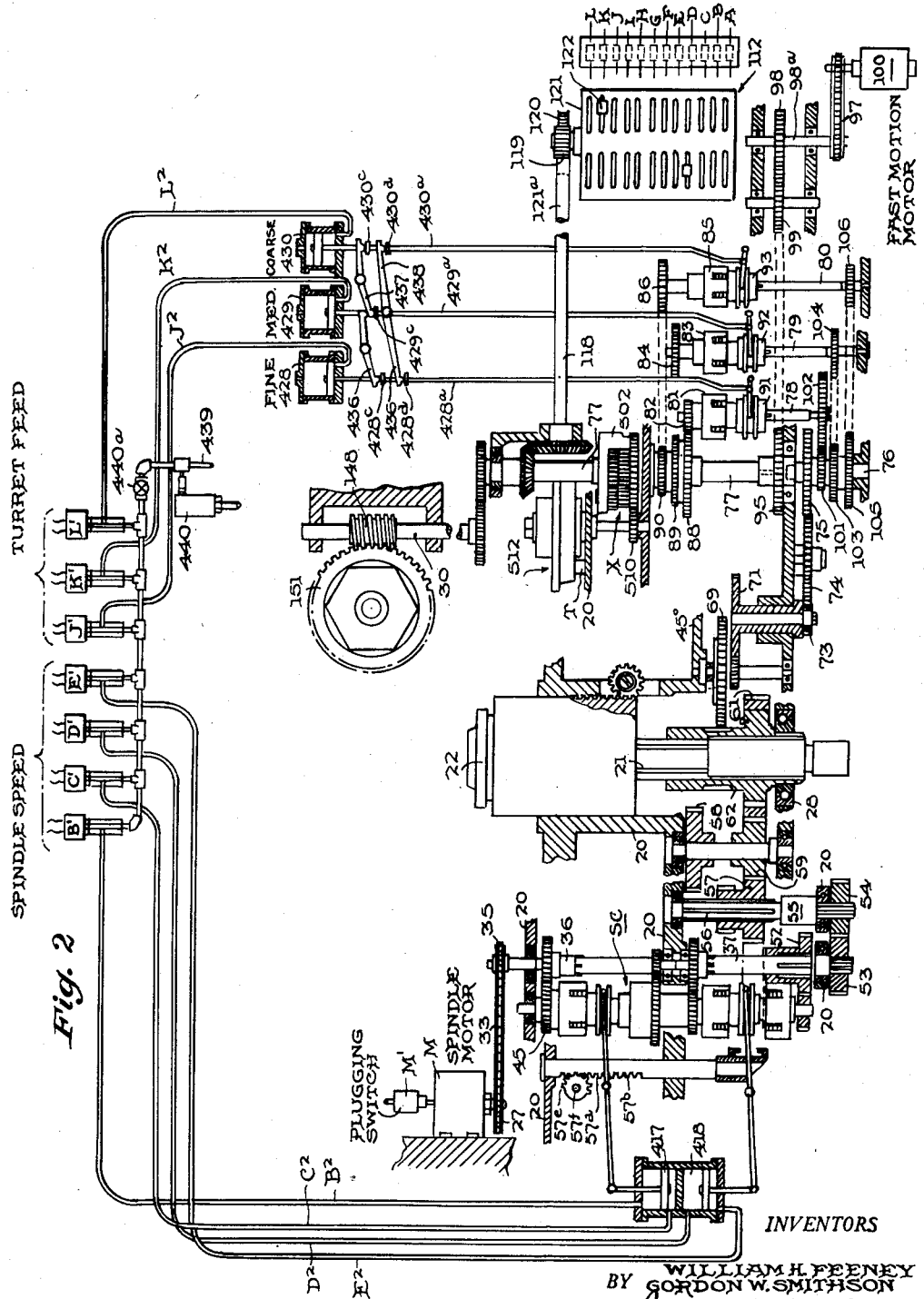

Patented July 14, 1953

2,645,134

UNITED STATES PATENT OFFICE 2,645,134

FEED AND TRAVERSE MECHANISM FOR AUTOMATIC TURRET LATHES

William H. Feeney, East Providence, and Gordon W. Smithson, Pawtucket, R. I., assignors to Niles-Bement-Pond Company, West Hartford, Conn., a corporation of New Jersey Application July 14, 1950, Serial No. 173,826

4 Claims. (Cl. 74—675)

The present invention relates to an improved power transmission device for a driven element and which imparts to said element intermittent transmission from two points of power input respectively of relatively low speed and of a high speed drive, the present invention accomplishing this result without the use of clutches or other shiftable or engageable and disengageable devices, thereby eliminating wear, adjustment and frequent replacement of such clutches entailed when such engageable and disengageable devices are employed.

Heretofore, so far as is known, where it has been desirable to intermittently change the speed of a driven element from one point of input to another, some shiftable or engaging and disengaging mechanism or over-running clutches have been required, and the parts of which clutches frequently get out of order or adjustment and are subjected to considerable wear requiring frequent replacement; and, in addition, with over-running clutches, there is always a time lag. This is true in machine tools, particularly of the automatic turret lathe type, wherein, as one example, it is desirable to feed the turret slides from a separate source of power, from the motion of the spindle driving mechanism or from the spindle itself so as to maintain a proper ratio between the said movements of the slide and spindle speed or rotation, and wherein it is further desirable to operate the idle (non-cutting) movements of the turret slide at higher rates of speed which may be accomplished by a separate motor or a separate transmission mechanism.

The present invention therefore has for its object the provisions of a novel transmission mechanism for the purposes enumerated that will result in the elimination of clutches and the like, and, in automatic machines, the elimination of considerable control mechanisms for automatically actuating said clutches, thus resulting in a much smoother and quieter running machine, effecting speed changes with greater celerity or responsiveness and with less wear-and-tear on the machine itself.

A further object of the invention is a transmission device as above generally described which is very simple in construction and occupies a very small space in any machine assembly.

The objects of the present invention are carried out by a mechanism having, broadly, the following features: a driven shaft; two sources of power input keyed to the shaft—one being high speed and intermittently power-driven and the other being low speed constantly driven but having a planetary unit, or its equivalent, interposed therein; both sources of power input driving the shaft in the same direction; the planetary unit, or its equivalent, being held stationary, except for the rotation of its planet gears, to impart low speed drive to said driven shaft when the high speed power input is not power-driven, but being permitted to be moved or rotated about said driven shaft when the high speed input is power-driven to drive said shaft therefrom or when said high speed input is inoperative so that the driving effect of the low speed input is ineffective on said shaft.

Other objects and features of this invention will appear and still others will be manifest as the specification proceeds.

As one example of use, the present invention is applicable to an automatic turret lathe shown in U. S. Patent No. 2,594,782, granted April 29, 1952, and the invention will be shown and described as a matter of convenience in connection with such turret lathe wherein it eliminates the main feed clutch 87, the fast-motion clutch 94 and the electrical and pneumatic control means for the latter. It is to be understood, however, that the invention is not to be limited to the exact combination and association in a lathe such as that shown in the above-mentioned patent because the invention is of more general application as will be obvious to those skilled in the art and is to be limited only by the scope of the terms used in the appended claims.

In the drawings, showing one preferred embodiment of my invention:

Figure 1 illustrates an automatic turret lathe with parts broken away showing the invention applied thereto in connection with certain parts thereof;

Figure 2 is a diagrammatic view illustrating the layout of the gearing driving a spindle and turret slide of the machine shown in Figure 1 and illustrating the disposition of the present invention X therein through which the shaft actuating the turret slide may be rotated from a high-speed source for imparting quick traverse movements or from a low-speed source for imparting slower "feed" movements to the turret slide as above mentioned;

Figure 3 is a longitudinal sectional view taken through the mechanism X of the present invention; and Figure 4 is a transverse sectional view taken substantially on line 4—4 of Figure 3.

Like characters of reference refer to similar views throughout the drawings.

In order that an understanding may be had of the machine illustrated in the drawings and to which the invention is applied, as one example of its use, it should be stated that the machine shown in Figure 1 of the drawings follows the general organizational pattern of the various instrumentalities found in certain types of automatic turret lathes.

Such a turret lathe comprises a bed 24 at one end of which is a headstock 20 having a horizontally disposed spindle 21 rotatably journalled therein and having disposed therein the power and variable transmission units of the machine. On the end of the spindle overlying the bed 24 is fixedly secured a chuck 22 in which a workpiece (not shown) may be clamped in the usual manner. The upper portion of the bed 24 is provided with an integral table member or portion 24a upon which is mounted a turret slide or carriage 23 for reciprocable sliding movement longitudinally of the bed and parallel to the axis of the spindle 21 toward and away from the chuck 22 on the spindle 21; and, also mounted on the bed 24 and disposed between the chuck 22 and the carriage 23, are front and rear cross slides 25 and 26, respectively, which may be operated independently or simultaneously to reciprocate at substantially right angles with respect to movement of the turret slide or carriage 23 and in cooperative relation with a workpiece that may be held on the chuck 22.

With particular reference to Figures 1 and 2, the headstock includes an outer casing for power plant motors, transmission mechanism, including its clutches, the electro-pneumatic mechanism for shifting the clutches, the electrical control mechanism, as well as to provide bearings 27 and 28 for the spindle 21 and a bearing 29 for the feed shaft 30 which operates the turret slide 23 through means of a disc-cam 135. The spindle 21 is driven by constant speed motor M connected by a sprocket chain or belt 33 passing over sprocket wheel on the motor shaft and a sprocket wheel 35 fast on the rotatable input power shaft 36 (Fig. 2).

The power from the shaft 36 goes through a four-speed change mechanism SC to a power output shaft 37, thence through hand-change gears 53 and 54 to the gear train 57, 58, 59 and 61, which latter is mounted fast on a sleeve 62 splined on spindle 21.

The turret slide 23 and the cross-slides 25 and 26 are actuated by a horizontally disposed cam disc 135 located within the hollow turret slide 23 and fast on a vertically disposed shaft 154 journalled in the base 24. A worm wheel 151 is fast to the shaft 154 and positioned to mesh with the worm 148 fast on the back feed shaft 30.

As particularly shown in Figure 2, the back feed shaft 30 is driven from the spindle 21 so that the feed movements of the turret slide 23 will always be in ratio per revolution of the spindle 21. This feed drive may be taken off of the spindle sleeve 62 (as shown) having teeth 68 meshing with a gear 69, which through the intermediate gears 71, 73, 74 and 75 impart motion to an input feed shaft 76 having three hand change gears 101, 103 and 105 splined thereon. The shaft 76 is axially aligned with and rotatably independent of an output feed shaft 77 which drives the feed shaft 30, the latter being in effect an extension of shaft 77 and is sometimes referred to as the "back-shaft." Each of these gears 101, 103 and 105 mesh, respectively, with mating hand change gears 102, 104 and 106 fast on countershafts 78, 79 and 80, respectively, and which shafts are grouped about the aligned input and output shafts 76 and 77 and suitably journalled in the housing 20. Clutch-heads 81, 83 and 85 are rotatably mounted, respectively, on said countershafts 78, 79 and 80, each clutch-head having a mating gear 82, 84 and 86 fast thereon, respectively, of different sizes and mesh, respectively, with a cluster gear fast on the feed output shaft 77. The cluster gear comprises three gears 88, 89 and 90 which are in constant mesh with gears 82, 84 and 86, respectively, and by selective engagement of the clutch-heads 81, 83 or 85—through operation of their respective slide-clutch-part or cone 91, 92 or 93 splined on shafts 78, 79 and 80, respectively—three automatic "feed" changes may be obtained and imparted to the out-put feed shaft 77 within the selected range obtainable through the hand change gears 102—102, 103—104, 105—106, respectively, to produce a fine or first feed, a medium or second feed, or a coarse or third feed as is well known in the art.

The fast or traverse motion of the tool slide 23 (that is, its idle motion from the time that any tool on the turret or slide, then in operation, has finished cutting and is brought back to clear the subject being machined, the turret indexed, and then moved forward to bring the next set of tools to the subject—all of which being well understood in the art) is obtained from any desired source, such as from the motor M through a suitable gear transmission or by means of a separate fast motion motor 100 as here shown, connected to the said output shaft 77. As shown, a sprocket chain 97, trained over a sprocket wheel on the shaft of the motor 100 and over a similar sprocket wheel on shaft 98a drives the latter and the meshing gears 98 and 99 which latter gear meshes with the mating gear 95 fast on the output shaft 77. With this arrangement and with the cluster gear 88—89—90 fast on the shaft 77, previous arrangements have required a double acting clutch (shown in said aforesaid co-pending application), or its equivalent, so that a rapid traverse or a feed motion may be selectively imparted to said shaft 77 and which has a neutral position so that motion of shaft 77, and the parts driven thereby, may be arrested or stopped.

The function of the machine-tool is controlled by a control means 112 that comprises a dog-drum 121 actuated from the feed output shaft 77 through a shaft 118, worm 119 and worm-wheel 120, the dog drum having adjustable dogs 122 selectively positioned thereon that operate electrical switches carried on a switchboard 123. These switches control various instrumentalities for moving shiftable elements of the machine and for opening and closing control circuits.

All of the above described mechanism and its operation and its automatic control are shown and described in detail in the aforesaid co-pending application.

The sudden stopping and starting of the feed and the fast motions impose heavy loads, shock and strains upon the connectible or disconnectible means (such as the clutches alluded to) causing them to come out of adjustment and to wear quickly and to require more frequent replacement than should be necessary. To this end, the mechanism X of the present invention is shown herein as replacing the so-called master feed and traverse clutch unit (87—94—96 shown in said co-pending application); but, of course, it is understood, as above pointed out, that the present invention may be used in other positions on the machine shown—for instance, for each feed change clutch 81, 83 and 85 or for the speed change mechanism SC—or in any other type of mechanism where it is found useful and suitable.

The mechanism X consists of a shaft, such as 77, having a gear 95 keyed thereon and the cluster gear 88—89—90 rotatable thereon. The cluster gear, however, is formed with an axially protruding sleeve 500 surrounding the shaft 77 and having at its free end an external gear 501 fast thereto and lying within a planetary cage or carrier 502 surrounding the shaft 77. The cage or carrier 502 comprises a side member $a$ having inwardly directed lateral flange members $b$ spaced about the perimeter of the side member $a$ and forming spacing elements against which another side member $c$ is disposed and held in place by bolts 503 extending through the members $a$, $b$ and $c$ (Figs. 3 and 4). The members $b$ may be one annular flange, as may be convenient or desirable. The plates $a$ and $c$ are formed with aligned openings $d$ and $e$, respectively, through which the shaft 77 extends. In the opening $d$ of plate $a$ is journalled the sleeve 504$a$ of gear 504 lying within the space of the cage 502, this gear 504 being keyed—or adapted to be keyed—as at 505, to the shaft 77.

Motion is to be transferred from the gear 501 on the projecting sleeve 500 of the cluster gear to the gear 504; and this is accomplished by a planetary gear arrangement comprising of one or more pairs of connected planet gears 506 and 507 meshing, respectively, with the gears 501 and 504 forming an epicyclical gear train. Each pair of gears 506 and 507 are keyed in side-by-side relationship on an arbor 508 journalled at its ends in suitable bearing openings in the side plates $a$ and $c$ of the cage 502 so that the gears 506 and 507 lie between said side plates and within the cage and opposite their respective mating gears 501 and 504. On the outer periphery of the plate $c$ of the cage 502, there is provided an external gear 509 (termed a traverse rate gear), which meshes with a pinion 510 keyed on a rotatable shaft 511, which latter has a braking device 512 thereon, preferably at one end thereof.

The braking device 512 may be of any suitable type or kind but is herein shown as of the magnetic type having a stationary disc-like surface $p$ in front of the magnetic field $p^1$ which is secured to a stationary part of the headstock frame 20 by suitable means such as bolts $p^2$. The shaft 511 is journalled in the frame 20 of the machine which forms a bearing for the ends thereof, one end portion of which extends through the center of the brake body $p^1$ and carries on the end thereof a disc-like brake shoe $p^3$ disposed in opposing relation with the surface $p$ of the brake body. The shoe $p^3$ is mounted on a suitable block $p^4$ keyed on the shaft 511 so that the shoe may be attracted to and against the braking surface $p$, when the brake is energized, thereby stopping the rotation of the shaft 511. The shoe $p^3$ is slidably mounted on stud projection $p^5$ removably threaded in the block $p^4$ and extending into an annular recess in the brake-body $p^1$.

In the arrangement shown in the drawings, the cluster gear 88—89—90 is rotated by either one of the gears 82, 84 or 86 of the feed change mechanism and the rotation of the cluster gear will be imparted to the shaft 77 when the brake 512 is operative—i. e. when the brake shoe $p^3$ thereof is in braking engagement with the surface $p$—and when rotational movement is not being imparted to the shaft 77 through the gears 95 keyed thereon. Thus, if one of the feed clutches 81, 83 or 85 is in engagement and the brake 512 is operative to hold shaft 511 and its pinion 510 stationary, the cage or carrier 502 will be held stationary and the cluster gear will rotate gear 504 keyed to shaft 77, this rotation being imparted by the gear 501 keyed to the sleeve 500 of the cluster gear and rotating planet gears 506 and 507 (both keyed to the arbor 508). When it is desired to apply a higher speed of rotation to the shaft 77 through gear 95 keyed thereon, the higher speed is applied to the gear 95—as by energizing the fast motion or traverse motor 100—and, at the same time, the brake 512 is released or rendered inoperative, thus causing the gear 95 rotating the shaft 77 to be driven from the gear 95 without requiring any disconnection to be made of the power means driving the cluster gear 88—89—90 as the releasing of the brake 512 causes the cage or carrier 502 to revolve about gears 501 and 504 and absorb the drive force imparted by the rotation of said cluster gear.

When it is desired to discontinue the higher traverse speed drive of the shaft 77 and go immediately into the slower feed movement or drive, the power drive to gear 95 is discontinued and simultaneously therewith the brake 512 is energized, applying the brake shoe $p^3$ against the surface $p$, causing the cage or carrier 502 to become stationary and immediately without any delay or lag, the power rotation of the cluster gear to be imparted to gear 504 keyed to the shaft 77. Should it be desired to stop the rotation of the shaft 77 while being driven by the cluster gear 88—89—90, this is accomplished by merely releasing the brake 512 and rendering it inoperative. On the other hand, should it be desired to stop the rotation of the shaft 77 while the shaft 77 is being driven at high speed by gear 95, this is accomplished by disconnecting the power from the gear 95, applying the brake 512 (so as to stop the momentum of the shaft 77 and of the parts in driven connection therewith) and then, after a suitable short time delay, releasing the brake so that the cage 502 is rotatable.

From the above, the operation of the mechanism X, shown in Figures 3 and 4, should be obvious, but when incorporated in an automatic turret lathe as shown in Figures 1 and 2, its operation and control should now be stated for clarity. The substitution of the mechanism X hereof for the master feed-and-traverse clutch 87—94—96 of the said co-pending application eliminates the shifting and latching mechanism P, latch solenoid H$^1$ and electro-pneumatic valve F$^1$ therefor and, consequently, necessitates a change in the circuit of the "fast motion-neutral-feed control" as shown in said co-pending application; and, since the fast motion or traverse motor 100 does not now run at all times while the machine is in operation, the holding interlock (480–2) of the fast motion motor 100 starter switch (480–1) and the hand-cranking-safety switch (A) have been removed from the spindle control circuit shown in said co-pending application; although the operation of the "speed change" control B to E and B¹ to E¹ and the "feed change" control J, K, L, J¹, K¹, and L¹ remain the same as in said co-pending application.

Having thus described the invention in the manner in which the same is to be performed, it is to be understood that the precise construction and arrangement shown and described is susceptible to modification and variation and, therefore, the invention is not to be limited except by the scope of terms of the appended claims.

That which is claimed, as new, is:

1. In a machine having a driven shaft, an electric motor positively connected with said shaft to drive the same at a relatively high rate of speed when said motor is energized, a rotatable element mounted about said shaft and constantly driven at a lower rate of speed and having a sun gear fast thereon, a second sun gear keyed to the shaft, a cage rotatably embracing said sun gears and having journalled therein at least one pair of planet gears fast with respect to each other and one of said planet gears meshing one of said sun gears respectively, and an operable brake device in braking association with said cage, whereby, when said brake is released, motion from said rotatable element on the shaft is not imparted to the latter and motion from said electric motor may be applied, when said motor is energized, and, when said brake is applied and said motor is de-energized, motion from said constantly rotatable element on said shaft may be imparted to said shaft and, when said motor is de-energized and said brake released, all drive to said shaft is removed therefrom.

2. In a machine having a driven shaft, a constantly driven gear rotatably mounted about said shaft and having an outwardly projecting sleeve fast thereon and surrounding said shaft, a sun gear fast on said sleeve, a second sun gear keyed to the shaft and disposed adjacent the other sun gear, a cage embracing said sun gears and rotatable about said shaft, at least one pair of planet gears journaled in said cage and fast with respect to each other and one of said planet gears meshing one of said sun gears respectively, another power input drive connected with said shaft to drive the same at a relatively high rate of speed and including means to start and stop the effective functioning of its drive to drive said shaft, and a brake device in braking association with said cage, means operatively connected with said brake device for applying and releasing it, whereby, when said brake is released, motion from said constantly driven gear is not imparted to the shaft and motion from said other power input drive may be applied to said shaft and, when said brake is applied and said other power input drive is ineffective, motion from said constantly driven gear on said shaft is imparted to said shaft.

3. In a machine having a driven member, an element rotatably mounted and constantly driven at a lower rate of speed and having a sun gear fast thereon, a second sun gear positively connected to the member, a rotatable cage embracing said sun gears and having journalled therein at least one pair of planet gears fast with respect to each other and one of said planet gears engaging one of said sun gears respectively, another power input drive connected with said member to drive the same at a relatively high rate of speed and including means to start and stop the effective operation of its drive to drive said member, a brake device in braking association with said cage including means to actuate said brake, and a selective control mechanism positioned to actuate said brake and said starting and stopping means of said other power input drive at selected times, whereby, when said brake is released, motion from said rotatable element is not imparted to the driven member and motion from said other power input drive may be applied to said member, and, when said brake is applied and said other power input drive is ineffective, motion from said constantly rotatable element may be imparted to said member and, when said brake is released and said other power input drive is ineffective, all drive to said member is removed therefrom.

4. In a machine having a driven shaft, a constantly driven gear rotatably mounted about said shaft and having an outwardly projecting sleeve fast thereon and surrounding said shaft, a sun gear fast on said sleeve, a second sun gear keyed to the shaft and disposed adjacent the other sun gear, a cage embracing said sun gears and rotatable about said shaft, at least one pair of planet gears journalled in said cage and fast with respect to each other and one of said planet gears meshing one of said sun gears respectively, another power input drive connected with said shaft to drive the same at a relatively high rate of speed and including means to start and stop the effective functioning of its drive to drive said shaft, and a brake device in braking association with said cage, means operatively connected with said brake device for applying and releasing it, and a selective control mechanism positioned to actuate said brake applying and releasing means and said starting and stopping means of said other power input drive at selected times, whereby, when said brake is released, motion from said constantly driven gear is not imparted to said shaft and motion from said other power input drive may be applied to said shaft and, when said brake is applied and said other power input drive is ineffective, motion from said constantly driven gear is imparted to said shaft and, when said brake is released and said other power input drive is ineffective, all drive to said shaft is removed therefrom.

WILLIAM H. FEENEY.
GORDON W. SMITHSON.

References Cited in the file of this patent
UNITED STATES PATENTS

| Number | Name | Date |
|---|---|---|
| 673,926 | Sattler | May 14, 1901 |
| 1,297,439 | Bugher | Mar. 18, 1919 |
| 1,621,915 | Weston | Mar. 27, 1927 |
| 2,144,735 | Granberg et al. | Jan. 24, 1939 |
| 2,330,985 | Meyer | Oct. 5, 1943 |
| 2,398,346 | Anderson | Apr. 16, 1946 |
| 2,455,876 | Potter et al. | Dec. 7, 1948 |